United States Patent
Lee et al.

(10) Patent No.: US 7,320,524 B2
(45) Date of Patent: Jan. 22, 2008

(54) PROJECTOR AND AIR FILTRATION DEVICE THEREOF

(75) Inventors: Hsuan-Cheng Lee, Kaohsiung (TW); Chang-Chien Li, Taoyuan (TW)

(73) Assignee: Benq Corporation, Taoyuan Shien (TW)

(*) Notice: Subject to any disclaimer, the term of this patent is extended or adjusted under 35 U.S.C. 154(b) by 289 days.

(21) Appl. No.: 11/126,133

(22) Filed: May 10, 2005

(65) Prior Publication Data
US 2005/0254021 A1    Nov. 17, 2005

(30) Foreign Application Priority Data
May 11, 2004    (TW) .............................. 93113203 A

(51) Int. Cl.
G03B 21/26    (2006.01)
G03B 21/22    (2006.01)
G03B 21/00    (2006.01)
A47B 8/10    (2006.01)
F24F 13/08    (2006.01)

(52) U.S. Cl. ...................... 353/60; 353/119; 312/10.1; 454/358; 454/367

(58) Field of Classification Search ................. 353/33, 353/31, 34, 52, 57, 58, 60, 61, 119; 55/497, 55/499, 501; 454/277, 905, 309, 358, 367; 349/5, 7; 348/748; 312/10.1; 352/242, 352/243, 146; 361/685, 687, 688
See application file for complete search history.

(56) References Cited

U.S. PATENT DOCUMENTS

| | | | |
|---|---|---|---|
| 5,938,501 A * | 8/1999 | Gerding et al. .................. 451/5 |
| 6,139,154 A * | 10/2000 | Haba ........................... 353/31 |
| 6,297,950 B1 | 10/2001 | Erwin ......................... 361/685 |
| 6,508,704 B1 * | 1/2003 | Wilson ........................ 454/277 |
| 7,086,740 B2 * | 8/2006 | Sample et al. ................. 353/52 |
| 2004/0182055 A1 * | 9/2004 | Wynn ........................... 55/497 |

FOREIGN PATENT DOCUMENTS

| JP | 2000126528 | 5/2000 |
|---|---|---|
| JP | 2004109781 | 4/2004 |

* cited by examiner

*Primary Examiner*—Melissa Jan Koval
(74) *Attorney, Agent, or Firm*—Thomas, Kayden, Horstemeyer & Risley

(57) ABSTRACT

An air filtration device for projector includes a holder, a filter, and a rack. The rack is movably disposed in the holder for supporting the filter. When the rack moves to a first position, the rack is received within the holder. When the rack moves from the first position to a second position, the filter is released from the rack for replacement.

14 Claims, 4 Drawing Sheets

PROJECTOR AND AIR FILTRATION DEVICE THEREOF

This application claims the benefit of Taiwan application Ser. No. 93113203, filed May 11, 2004, the subject matter of which is incorporated herein by reference.

BACKGROUND OF THE INVENTION

1. Field of the Invention

The invention relates in general to an air filtration device, and more particularly to an air filtration device applied to a projector.

2. Description of the Related Art

With advanced development in technology, electrical products are popularly used in people's daily life. However, waste heat is produced when the electrical products works so that it is necessary to spread heat effectively to keep the electrical products under appropriate temperature.

Conventionally, a lamp of a projector emits lights but also produces heat, and heat is spread by air convection. However, the surface of the lamp may be covered with dust or other particles suspended in the air so that the temperature distribution on the surface of the lamp is greatly affected and becomes uneven, which easily causes accident like lamp explosion. Therefore, a filter will be added to the projector for filtering out dust or other particulars suspended in the air.

When the filter is used for a period of time, dusts or other particles may be accumulated on the filter and the filter is obstructed so that the air can't pass through the filter. Then, heat produced from the lamp can not be spread by airflow successfully, and temperature of the lamp increases, which may cause the lamp to burst.

Therefore, it is necessary to replace the filter timely to ensure that the projector can work well. However, users cannot replace the filter of the projector by themselves. Once users want to replace the filter, they have to bring the projector to the customer office to disassemble the projector and then the filter can be taken out, which is very inconvenient.

SUMMARY OF THE INVENTION

It is therefore an object of the invention to provide air filtration device allowing users to replace the filter without using any complicated tools.

The invention achieves the above-identified object by providing an air filtration device for projector includes a holder, a filter, and a rack. The rack is movably disposed in the holder for supporting the filter. When the rack moves to a first position, the rack is received within the holder. When the rack moves from the first position to a second position, the filter is released from the rack for replacement.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
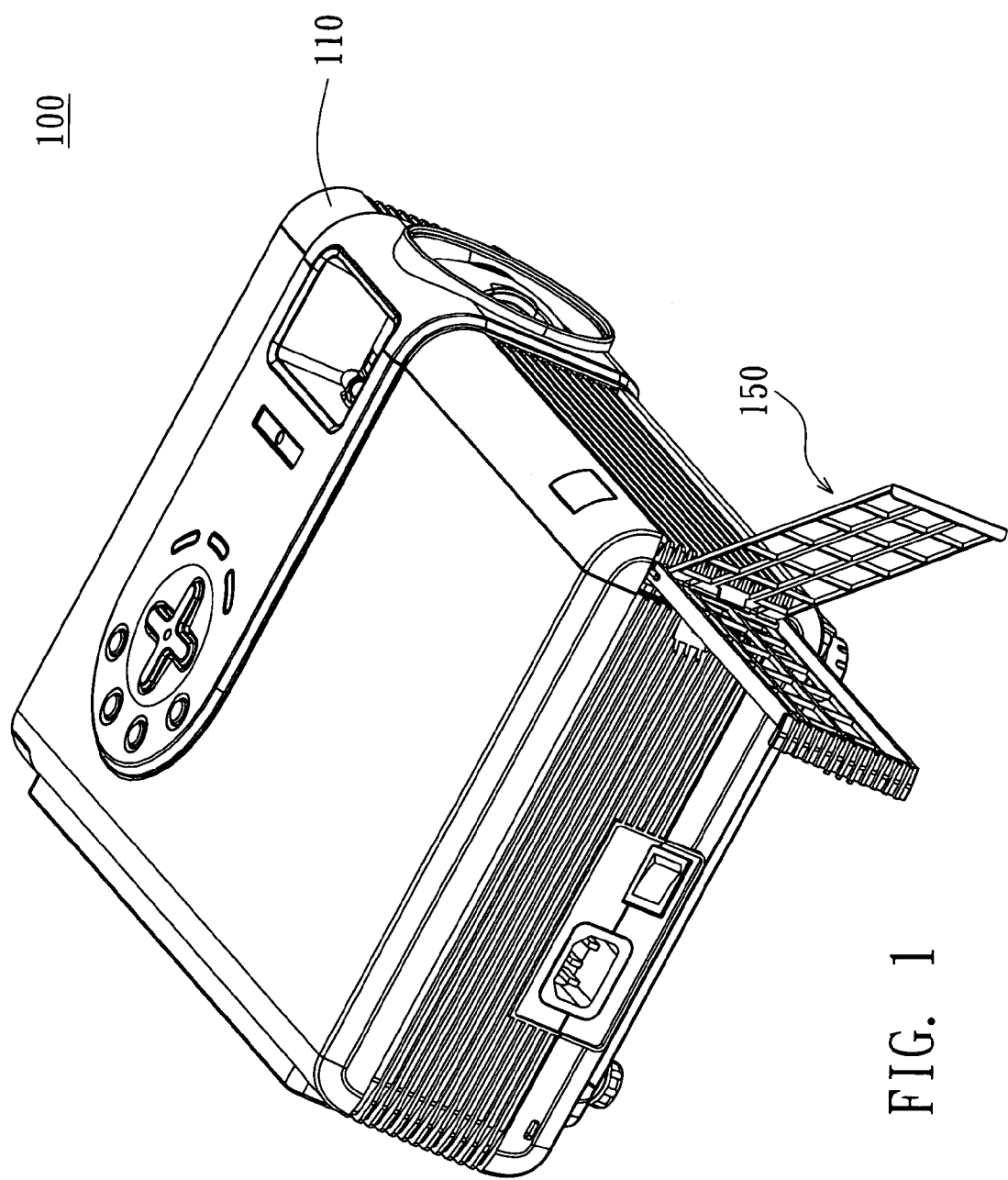
FIG. 1 is a schematic view of a projector according to the preferred embodiment of the invention.
Figure 2:
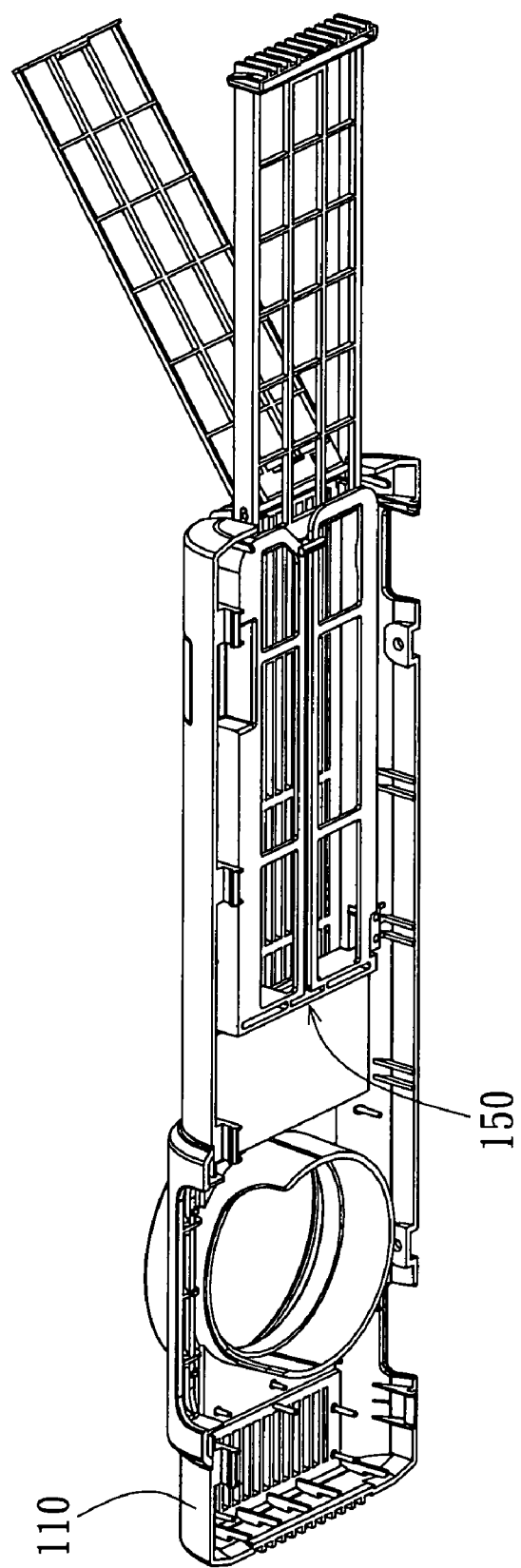
FIG. 2 is a schematic view of internal parts of the projector in FIG. 1.

Referring both to FIG. 1 and FIG. 2, FIG. 1 is a schematic view of a projector according to the preferred embodiment of the invention, and FIG. 2 is a schematic view of internal parts of the projector in FIG. 1. The projector 100 of the present invention includes a casing 110 and an air filtration device 150 which is disposed within the casing 110 for filtering air.

Figure 3:
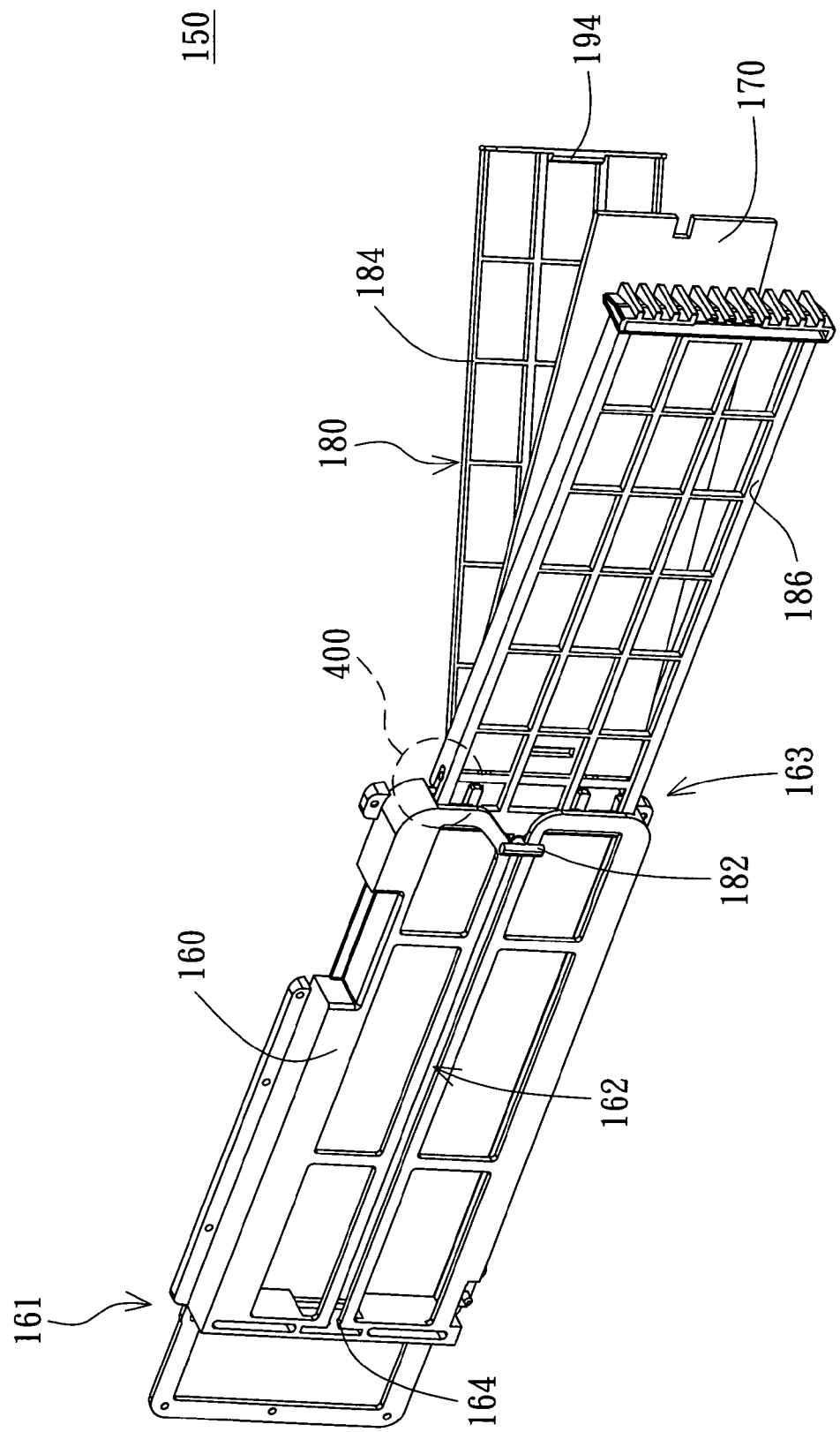
FIG. 3 is an enlarged view of the air filtration device for the projector in FIG. 1.
Figure 4:
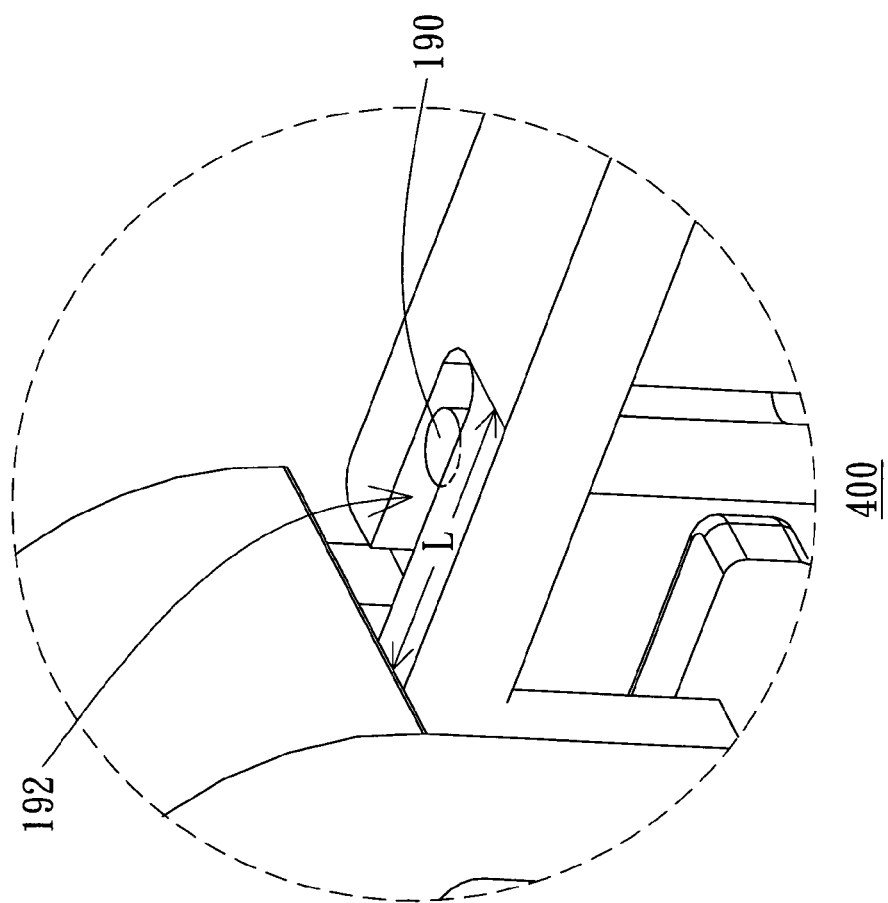
FIG. 4 is an enlarged view of the air filtration device in FIG. 3.

Referring both to FIG. 3 and FIG. 4, FIG. 3 is an enlarged view of the air filtration device for the projector in FIG. 1, and FIG. 4 is an enlarged view of the air filtration device in FIG. 3. The air filtration device 150 includes a holder 160, a filter 170 and a rack 180. The filter is held by the rack 180, and the rack is movably disposed in the holder 160 and between a first position 161 and a second position 163. When the rack 180 moves to a first position 161, the rack 180 is received within the holder 160, and when the rack 180 moves from the first position 161 to a second position 163, the filter 170 is released from the rack 180 for replacement. Thus, users are able to replace the filter 170 easily.

The holder 160 includes a sliding track 162, and the sliding track 162 preferably has an engaging part 164. The rack 180 includes a protrusion 182 corresponding to the sliding track 162. The protrusion 182 may slide on the sliding track 161 so that the rack 180 moves within the holder 160. When the rack 180 moves to the first position 161, the protrusion 182 is connected with the engaging part 164 and then the rack 180 is fixed in the first position 161.

Besides, the rack 180 further includes a first frame 184 and a second frame 186. The first frame 184 has a pivot 190 for connecting with the second frame 186 so that the first frame 184 may pivotally connects with and rotate relative to the second frame 186. The second frame 186 includes a slot 192 extending a predetermined distance L along a direction for receiving the pivot, so that when the rack 180 moves to the second position 163, the pivot 190 moves along the slot 192 for the predetermined distance L. Therefore, the first frame 184 and the second frame 186 can be moved reciprocally.

Further, the rack preferably includes a hook 194 for allowing the first frame 184 being fixed on the second frame 186 when the first frame 184 pivotally moves relative to and close to the second frame 186.

When users would like to replace the filter 170, simply process is proceeded as follow. The rack 180 moves from the first position 161 to the second position 163, the pivot 190 moves along the slot 192 for the predetermined distance L, and then the first frame 184 and the second frame 186 can be moved reciprocally so as to replace the filter 170.

Alternately, the rack may be separated in the second position from the holder so that the first frame rotates around the pivot and is separated from the second frame. Therefore, the filter between the first and second frames is easily replaced The projector of the present invention with the air filtration device allows users to replace the filter without using any complicated tools and the filter can be easily replaced by only moving the rack from the projector. Therefore, the projector can replace the filter easily and fast. Also, such accident like lamp explosion can be prevented.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
    a casing; and
    an air filtration device, disposed within the casing and including:
        a holder;
        a filter; and
        a rack movably disposed in the holder for supporting the filter; wherein when the rack moves to a first position, the rack is received within the holder, and when the rack moves from the first position to a second position, the filter is released from the rack for replacement wherein the rack further includes:
            a first frame; and
            a second frame, pivotally connected with the first frame; wherein the filter is disposed between the first frame and the second frame.

2. The projector according to claim 1, wherein the holder includes a sliding track, and the rack includes a protrusion corresponding to the sliding track, so that the protrusion slides on the sliding track when the rack moves.

3. The projector according to claim 2, wherein the sliding track includes an engaging part for fixing the protrusion when the rack moves to a first position.

4. The projector according to claim 1, wherein the rack is separated from the holder in the second position for replacing the filter.

5. The projector according to claim 4, wherein the first frame includes a pivot for connecting with the second frame, and the first frame rotates around the pivot and is separated from the second frame in order to replace the filter.

6. The projector according to claim 1, wherein the first frame and the second frame are connected by way of reciprocally moving, and the filter is disposed between the first frame and the second frame.

7. The projector according to claim 6, further comprising a pivot deposed in the first frame and a slot formed on the second frame and extending a predetermined distance along a direction for receiving the pivot, wherein when the rack moves to the second position, the pivot moves along the slot for the predetermined distance so that the first frame rotates around the pivot and is separated from the second frame to release the filter for replacement.

8. An air filtration device, comprising:
    a holder;
    a filter; and
    a rack movably disposed in the holder for supporting the filter;
    wherein when the rack moves to a first position, the rack is received within the holder, and when the rack moves from the first position to a second position, the filter is released from the rack for replacement wherein the rack further includes:
        a first frame; and
        a second frame, pivotally connected with the first frame; wherein the filter is disposed between the first frame and the second frame.

9. The air filtration device according to claim 8, wherein the holder includes a sliding track, and the rack includes a protrusion corresponding to the sliding track, so that the protrusion slides on the sliding track when the rack moves.

10. The air filtration device according to claim 9, wherein the sliding track includes an engaging part for fixing the protrusion when the rack moves to a first position.

11. The air filtration device according to claim 8, wherein the rack is separated from the holder in the second position in order to replace the filter.

12. The air filtration device according to claim 11, wherein the first frame includes a pivot for connecting with the second frame, and the first frame rotates around the pivot and is separated from the second frame in order to replace the filter.

13. The air filtration device according to claim 8, wherein the first frame and the second frame are connected by way of reciprocally moving, and the filter is disposed between the first frame and the second frame.

14. The air filtration device according to claim 13, further comprising a pivot deposed in the first frame and a slot formed on the second frame and extending a predetermined distance along a direction for receiving the pivot, wherein when the rack moves to the second position, the pivot moves along the slot for the predetermined distance so that the first frame rotates around the pivot and is separated from the second frame to release the filter for replacement.

* * * * *